Nov. 25, 1969     K. N. MATHES     3,480,846
CRYOGENIC CAPACITOR
Filed April 8, 1968
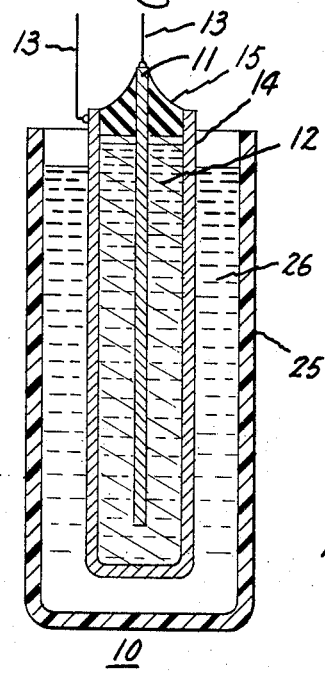
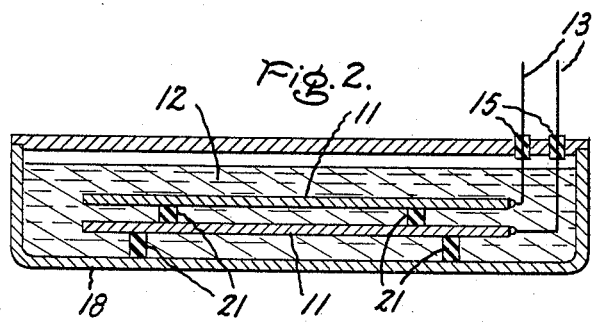
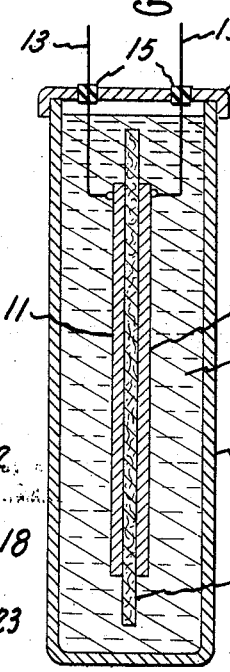
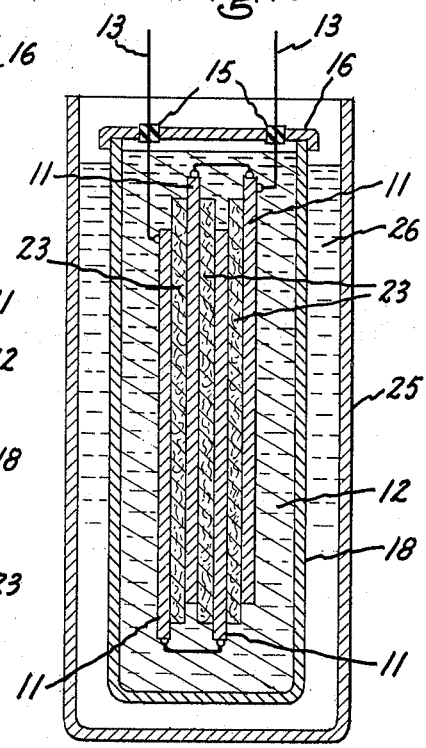
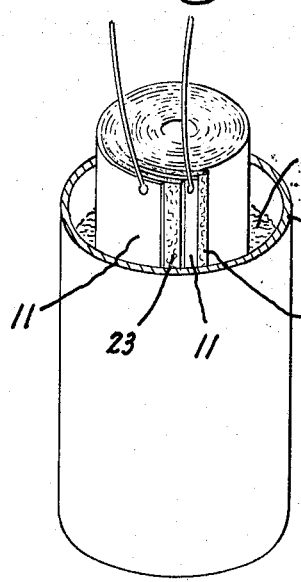
Inventor:
Kenneth N. Mathes,
by William T. Black
His Attorney.

United States Patent Office 3,480,846
Patented Nov. 25, 1969

3,480,846
CRYOGENIC CAPACITOR
Kenneth N. Mathes, Schenectady, N.Y., assignor to General Electric Company, a corporation of New York
Filed Apr. 8, 1968, Ser. No. 719,570
Int. Cl. H01g 1/08, 1/00
U.S. Cl. 317—243
7 Claims

ABSTRACT OF THE DISCLOSURE

A low temperature capacitor is produced by surrounding a plurality of electrodes with a liquid consisting of 1-nitropropane or a mixture of 1-nitropropane and isopentane and cooling to temperatures below about $-100°$ C., whereby said liquid mixture is frozen or rendered extremely viscous between the electrodes.

CRYOGENIC CAPACITOR

This invention relates to capacitors and more particularly capacitors which are operable at temperatures below about $-100°$ C. and lower.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

A conventional type of capacitor has a pair of parallel, electrically conducting plates or electrodes separated by an electrically insulating or dielectric film and has an electrical lead to each of the electrodes. The dielectric film employed should have a low dissipation factor, be reasonably thin, have a high dielectric constant and a high breakdown strength.

Capacitors which can be employed at temperatures below $-100°$ C. and lower are desirable as energy storage and discharge devices, in electronic circuits, in space applications and for power factor correction. In these types of capaictor applications at low temperatures the decreased size of the energy storage and discharge devices provides associated low conductor resistance and low inductance. The high direct current resistance of the dielectric in such a device is also important in many applications. Such energy storage capacitors have application in atomic fusion, radar and laser power supplies, high energy metal forming and mining, because the desirable small size and reliability justifies the cost of refrigerating such a device. This invention is directed to an improved cryogenic capacitor with a dielectric which exhibits the above-desirable characteristics at temperatures of $-100°$ C. or lower.

In accordance with this invention an improved cryogenic capacitor is produced which comprises a first electrode, a continuous dielectric material contacting a surface of the first electrode, the dielectric comprising 1-nitropropane or a mixture of 1-nitropropane and isopentane, a second electrode in contact with the dielectric with an electrical lead connected to each of the electrodes and a container for holding the dielectric liquid, together with a means for cooling said container to a temperature below about $-100°$ C.

These objects and various other features and advantages of the invention will be better understood from the following description taken in connection with the accompanying drawing.

In constructing the cryogenic capacitors of this invention it is sometimes advantageous to employ a separator such as a porous or fibrous dielectric other than the liquid dielectric to maintain the electrodes spaced apart from each other. The porous, fibrous or open matrix can be, for example, unwoven glass mat or paper, porous alumina, a porous ceramic, woven glass cloth, etc. These separators are then placed between the electrodes and the total structure placed in the container and the liquid 1-nitropropane or mixture of 1-nitropropane and isopentane placed in the container whereby the interstices of the fibrous materials or the pores or the porous materials are filled with the liquid and the electrodes are completely separated by the dielectric liquid. The capacitor can then be placed in a refrigerating means wherein the temperature is lowered to about $-100°$ C. or lower, whereby the liquid dielectric becomes very viscous or freezes to a solid, thereby producing a cryogenic capacitor.

The capacitors of this invention exhibit a high dielectric constant, and a low dielectric loss at temperatures below about $-100°$ C. These cryogenic capacitors are produced in various configurations, for example, a single unit having a first electrode, the dielectric being in intimate contact with the electrode, a second electrode in contact with the dielectric and separated from said first electrode by said dielectric and an electrical lead connected to the electrodes. Other structures include a plurality of stacked, interleaved electrodes separated by the above types of dielectric and a rolled capacitor.

It has been found that pure, thin aluminum and copper sheet and foil possess very low electrical resistance at these low temperatures, which makes these materials particularly useful as electrodes in the capacitors of this invention.

The dielectrics employed in the capacitors of this invention consist essentially of 1-nitropropane and mixtures of 1-nitropropane and isopentane wherein the amount of isopentane can be up to 50%, by weight, of the total mixture. It is, of course, obvious that there is no lower limit on the amount of isopentane employed.

In some of the configurations of the capacitors of this invention, it will be necessary to employ separators to maintain the spacings of the electrodes in the event that the capacitor be exposed to temperatures above the melting point of the dielectric for a time sufficient to melt the dielectric. Such separators can be, for example, strips of woven or unwoven glass fibers, strips of paper, porous alumina or ceramic sheets or small, solid dielectric spacers of alumina or ceramic, etc.

The means of maintaining the temperature of the cryogenic capacitors of this invention below $-100°$ C. are those known in the refrigeration industry, such as, liquid nitrogen, $CF_4$, methane, and other liquefied gases having boiling points below $-100°$ C. It is, of course, understood that where liquefied gases containing oxygen are employed adequate safety precautions must be taken to prevent contact of the organic material with the refrigerant. One can also employ mixtures of liquid nitrogen with methylcyclopropane and the like.

FIGURE 1 is a sectional view of a cryogenic capacitor of this invention;

FIGURE 2 is a sectional view of a modified cryogenic capacitor;

FIGURE 3 is a sectional view of another modified cryogenic capacitor;

FIGURE 4 is a sectional view of another modified cryogenic capacitor; and

FIGURE 5 is a sectional view of a rolled cryogenic capacitor in accordance with this invention.

In FIGURE 1, of the drawing, there is shown generally at 10 a cryogenic capacitor comprising a first inner electrode 11 of a suitable material such as thin copper or aluminum sheet or foil, and a dielectric material 12 surrounds said first electrode. A second container electrode 14 (which also serves as the container for the dielectric liquid) of similar or dissimilar metal is in contact with the dielectric 12 and spaced apart from the first electrode 11. A pair of electrical leads 13 are connected to the respective electrodes 11 and 14 to complete the capacitor structure. The first electrode 11 extends through a flexible insulating bushing 15 in an annular opening in the second electrode 14. The bushing is constructed of flexible material such as silicone rubber, etc. The bushing should be flexible to allow for expansion and contraction of the dielectric. There surrounds this construction a case 25 constructed of a heat insulating material to hold refrigerating fluid 26.

As it is shown in FIGURE 1 of the drawing, the bushing dielectric material extends to the respective edges of both electrodes 11 and 14 and thus prevents arcing or flash over between the electrodes.

It is preferred to form capacitor 10 in FIGURE 1 of the drawing by first filling the container with liquid 1-nitropropane or a mixture of 1-nitropropane and isopentane and then suspending the inner electrode 11 in such liquid dielectric 12 and sealing the container electrode 14 with the flexible bushing 15 and then cooling the entire apparatus to temperatures below about −100° C. by adding refrigerating fluid 26 (e.g., liquid nitrogen) to case 25 so that the liquid dielectric 12 freezes and thus maintains electrode 11 spaced apart from and out of contact with the container electrode 14.

The above capacitor was then tested by immersing the device in the case 25 filled with a refrigerating fluid 26, such as liquid nitrogen or the like, or just suspending it above the liquid nitrogen so that the temperature of the capacitor is maintained below about −100° C. and the capacitor tested for shorts. If no shorts were found the dielectric constant was measured and found to be 46 and the dissipation factor (tan-δ) was 0.15.

In FIGURE 2 of the drawing, there is shown a modified capacitor which has a pair of parallel electrodes 11, each of which has a lead 13 connected thereto. The electrodes are maintained in spaced relationship to one another and separated from the container wall by spacers 21. The spacers 21 can be ceramic, alumina and the like. The leads 13 leave the container through an annular orifice filled with the insulating bushing 15 of silicone rubber and the like. The electrodes 11 are surrounded by the dielectric 12.

The capacitor shown in FIGURE 2 is formed by inserting spacers 21 in position in case 18, inserting electrode 11, adding the second spacers and then the second electrode 11. The liquid dielectric 12 is then added and the apparatus is cooled to below −100° C. to freeze the dielectric 12. An insulating rubber gasket 15 can then be placed over the opening in case 18 as a seal.

In FIGURE 3 of the drawing, there is shown a further modified capacitor in accordance with this invention which employs a pair of parallel electrodes 11, each of which has a lead 13 connected thereto, which leads 13 exit through the container lid 16 through insulating bushing 15. The dielectric material for this capacitor is a composite structure comprising a separator 23 of open, woven glass cloth or unwoven glass mat into which is impregnated with the dielectric liquid 12 which liquid becomes solid when the temperature is lowered below its freezing point. In the preparation of the capacitor, the electrodes 11 with the woven glass mat positioned therebetween are suspended in container 18 and the liquid dielectric 12 poured into the container. The electrode leads are then draw through lid 16 through an annular opening surrounded by the insulating bushing 15 and the temperature then lowered below the freezing point of the dielectric 12 and then to below −100° C. The matrix 23 can also be impregnated with the dielectric by vacuum impregnating techniques.

In FIGURE 4 of the drawing, there is shown a modified capacitor device which comprises a plurality of interleaved electrodes 11 with a separator 23 comprised of woven or unwoven glass fibers or other porous material therebetween impregnated with dielectric 12 which fills thermal conducting case 18. A plurality of electrode foils with the separator 23 and the dielectric material 12 therebetween are stacked together. In this configuration, the ends of each of the electrodes extend beyond the edges of the stacked extended foil and are arranged in alternate fashion to provide electrical connections. Electrode leads 13 are connected to the electrodes and extend through bushing 15 in lid 16 covering thermal conducting case 18.

The device in FIGURE 4 is further modified by employing a container 25 for a low temperature liquid 26, such as liquid nitrogen, liquid hydrogen or helium, or mixtures of liquid nitrogen and other materials to provide a means whereby the capacitor device is cooled to below −100° C.

In FIGURE 5 of the drawing, there is shown a modified capacitor roll device which comprises a pair of electrodes 11 with a porous ceramic or fiberglass separator 23 therebetween which are inserted in thermal conducting case 18 containing dielectric 12 which dielectric permeates the interstices of the porous separator 23. An additional separator 23 is positioned on the upper surface of the second electrode 11, whereby the layers can be formed into a capacitor roll.

In preparing the devices in the figures it is, of course, obvious that the dielectric material must completely separate the electrodes and that the level in the container must be sufficient so that the electrodes are completely immersed in the dielectric.

Examples of capacitor devices formed in accordance with this invention are as follows:

EXAMPLE 1

A capacitor arrangement, as shown in FIGURE 1 of the drawing, was made by suspending an aluminum electrode 11 in a solid nickel container 14 holding approximately 77 cubic centimeters of 1-nitropropane. The nickel container was then surrounded by liquid nitrogen to freeze the dielectric to a solid. The nickel container (capacitor) was then removed from the nitrogen and surrounded with glass fiber thermal insulation so that warming would occur slowly. The measurements of capacitance and dissipation factor were made in accordance with ASTM Method D150. The dissipation factor (tan-δ) of 1-nitropropane at 1 KHz (1 kilohertz) and at −100° C. was 0.15, and the permittivity (dielectric constant) was 46.

EXAMPLE 2

A capacitor is constructed in accordance with the procedure of Example 1; however, a mixture of 4 parts of 1-nitropropane, by volume, to 1 part, by volume, of isopentane is employed as the dielectric. The device is tested by the procedure given in Example 1 and is found to be a capacitor.

EXAMPLE 3

A rolled capacitor as shown in FIGURE 5 and employing matted glass fibers as spacers between two aluminum foil electrodes containing wire leads can be rolled so that each metal electrode is separated from the other by the matted, porous glass fibers and the entire construction dipped into a mixture of 4 parts, by volume, of 1-nitropropane and 1 part, by volume, of isopentane in a container and then cooled to −100° C. to yield a rolled type low temperature capacitor. The device is tested in accordance with the procedure of Example 1.

Other modifications and variations of the capacitor devices within the scope of this invention other than those in the above examples can be made by referring to the drawings and specifications.

What is claimed as new and is desired to be secured by Letters Patent of the United States is:

1. A capacitor for use at temperatures below about −100° C. which comprises two opposed electrodes providing a dielectric space between them, electrical leads attached to said electrodes for connecting the electrodes in an electric circuit, and a dielectric material consisting of 1-nitropropane or a mixture of 1-nitropropane and isopentane contacting the opposed surfaces of the electrodes and substantially filling the dielectric space between said electrodes.

2. A capacitor as in claim 1 including refrigerating means for maintaining the temperature of the electrodes and dielectric material below about −100° C.

3. A capacitor as in claim 1 in which a porous solid also separates the electrodes.

4. A capacitor as in claim 3 in which the porous solid is open, unwoven glass mat.

5. A capacitor as in claim 1 wherein the capacitor is in a roll structure.

6. A capacitor for use at temperatures below about −100° C. which comprises a plurality of adjacent electrodes spaced apart by a porous spacer and where the interstices between said electrodes are filled with a dielectric consisting of 1-nitropropane or a mixture of 1-nitropropane and isopentane, said electrodes being alternately connected electrically, each of the terminal electrodes having an electrical lead connected thereto and means for maintaining said temperature below about −100° C.

7. A process for producing a capacitor for use at temperatures below about −100° C. which comprises establishing two electrodes in spaced relatinship with one another, filling the space between the electrodes with a liquid dielectric material selected from the class consisting of 1-nitropropane and a mixture of 1-nitropropane and isopentane and cooling said electrodes and said liquid dielectric material to a temperature below about −100° C.

References Cited

UNITED STATES PATENTS

| | | | |
|---|---|---|---|
| 1,960,415 | 5/1934 | Miller | 317—258 X |
| 2,860,322 | 11/1958 | Stadler | 317—243 X |

E. A. GOLDBERG, Primary Examiner

U.S. Cl. X.R.

29—25.42; 252—64; 317—258